D. RODGERS.
PORTABLE MILLING MACHINE.
APPLICATION FILED JAN. 15, 1917.

1,249,672.

Patented Dec. 11, 1917.
2 SHEETS—SHEET 1.

INVENTOR
David Rodgers
BY
*Pierre Barnes*
ATTORNEY

D. RODGERS.
PORTABLE MILLING MACHINE.
APPLICATION FILED JAN. 15, 1917.
1,249,672.
Patented Dec. 11, 1917.
2 SHEETS—SHEET 2.
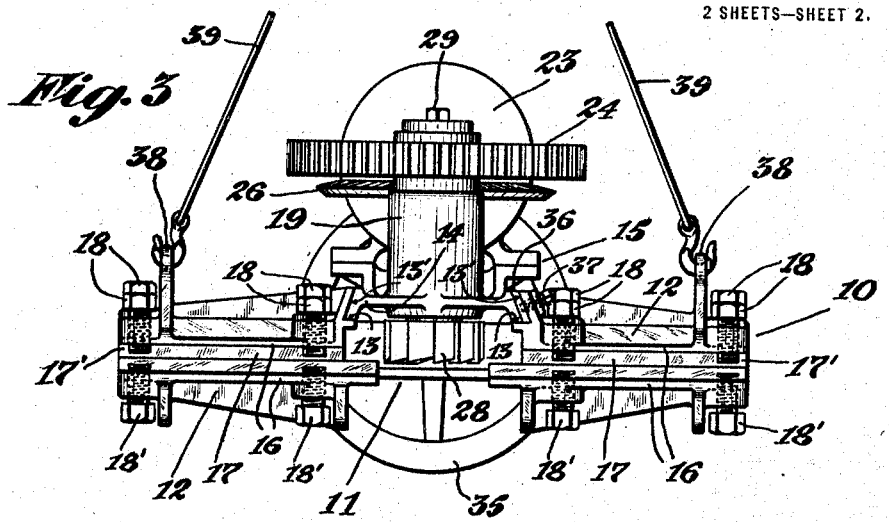
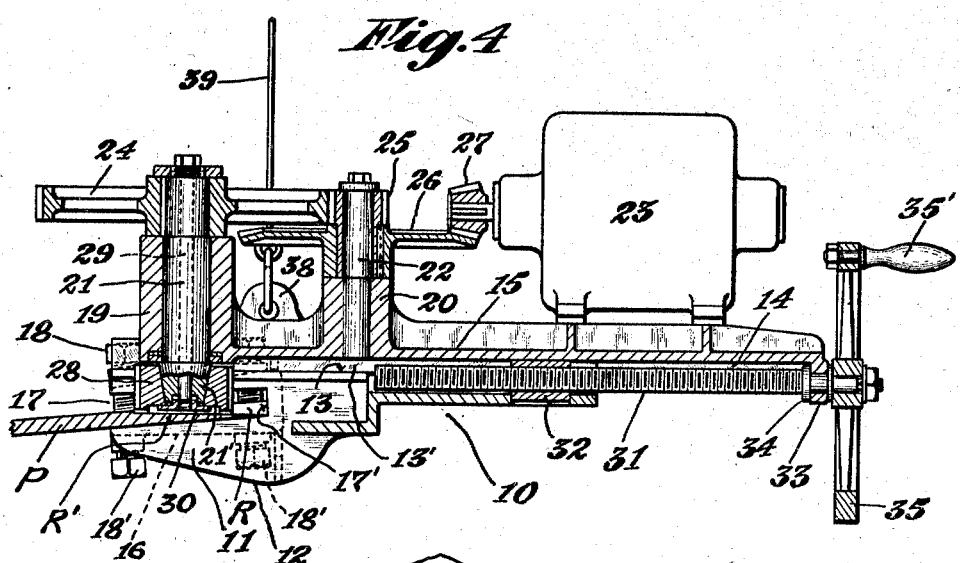
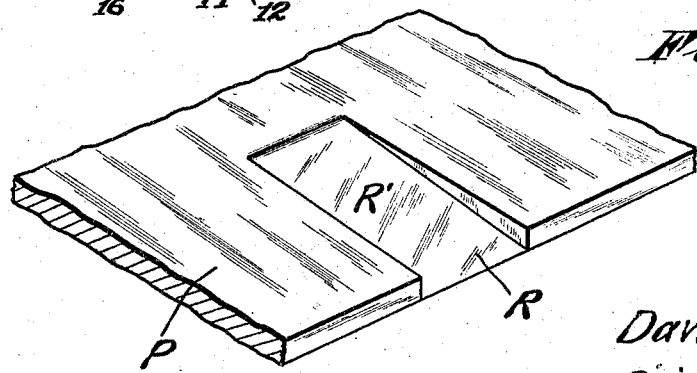
INVENTOR
David Rodgers.
BY
Pierre Barnes
ATTORNEY

UNITED STATES PATENT OFFICE.

DAVID RODGERS, OF SEATTLE, WASHINGTON, ASSIGNOR TO SKINNER & EDDY CORPORATION, OF SEATTLE, WASHINGTON, A CORPORATION OF WASHINGTON.

PORTABLE MILLING-MACHINE.

1,249,672.     Specification of Letters Patent.     Patented Dec. 11, 1917.

Application filed January 15, 1917. Serial No. 142,366.

*To all whom it may concern:*

Be it known that I, DAVID RODGERS, a citizen of the United States, residing at Seattle, in the county of King and State of Washington, have invented certain new and useful Improvements in Portable Milling-Machines, of which the following is a specification.

This invention relates to improvements in portable milling machines. The object of the invention is the provision of an efficient machine of this character which is especially designed for cutting frame-receiving recesses in metal plates such as utilized in the construction of the hulls of marine vessels, the operation of the milling cutter being controlled so as to insure accuracy and uniformity in its operations without requiring special skill or adjustment on the part of the operator.

The invention consists essentially in a frame provided with work-clamping devices, a carriage mounted on the frame and carrying a milling cutter and its operating mechanism.

The invention further consists in the novel construction, adaptation and combination of parts, as will be hereinafter described and claimed.

Figure 1:
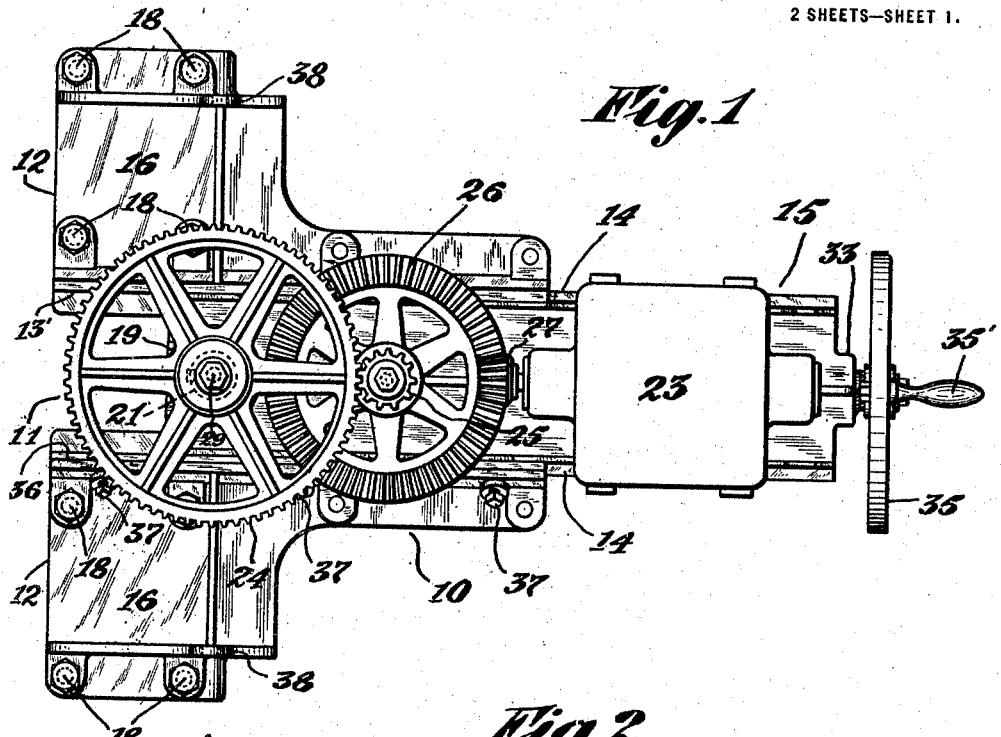
Figure 2:
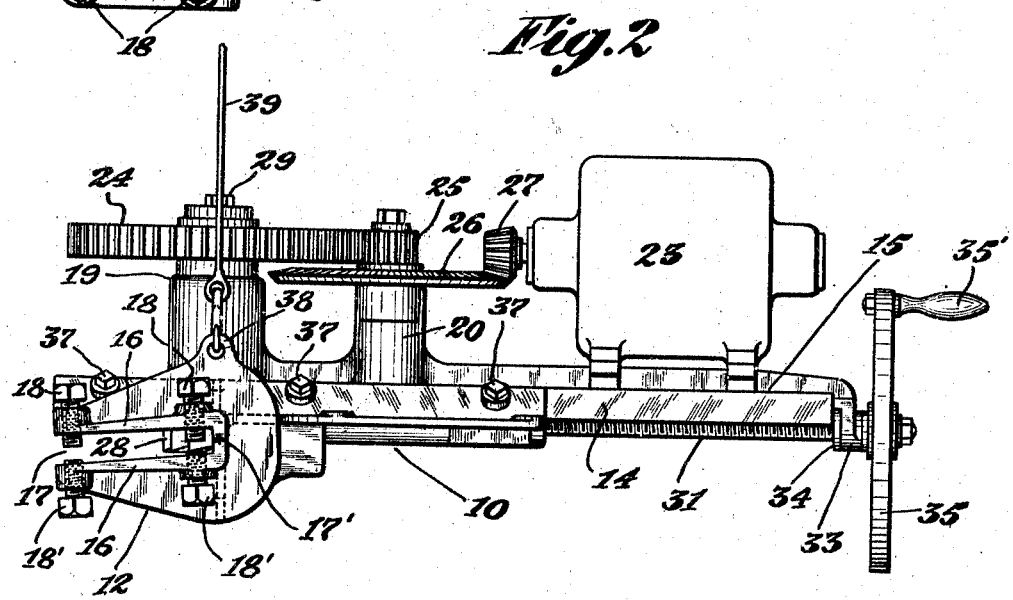

In the accompanying drawings, Figure 1 is a plan view of a machine embodying the present invention. Fig. 2 is a side elevational view thereof. Fig. 3 is a front elevational view of the same. Fig. 4 is a longitudinal vertical section of the machine shown applied to the work. Fig. 5 is a perspective fragmentary view of a plate having a recess such as may be cut therein through the instrumentality of the present invention.

The machine is provided with a frame 10 having a bifurcated front portion to afford a gap 11 (Fig. 1) between two wing members 12. At each side of said gap the frame is formed with grooves having relatively inclined surfaces 13 and $13^1$ to afford a longitudinal guideway of dove-tail shape to receive a correspondingly shaped base 14 of a carriage 15 which carries the operating mechanism.

Each of said wing members are formed or provided with one or more pairs of longitudinally disposed jaws 16, the complementary ones being arranged to furnish therebetween slots 17 which extend rearwardly from the front of the frame in inclined relation to the aforesaid guideway.

18 and $18^1$ represent set screws extending through the frame jaws 16 into the respective slots and serve to rigidly clamp the frame to the work, such as a plate P, when the latter is introduced into the slots, as illustrated in Fig. 4.

Said carriage is provided with journal boxes 19 and 20 for upright shafts 21 and 22 one in advance of the other and in front of an electric motor 23 which is rigidly secured to the rear end of the carriage. The shaft 21 has mounted thereon a spur gear 24 meshing with a corresponding pinion 25 mounted on the shaft 22 on which is also mounted a bevel gear 26 which is driven by a pinion 27 provided on the armature shaft of said motor.

The shaft 21 extends below its journal box 19 into the frame gap 11 to receive a milling cutter 28 which is desirably connected to the shaft by having a tapering portion $21^1$ of the latter fit into a correspondingly-shaped socket of the cutter and by the provision of a coupling bolt 29 extending axially through the shaft and with its threaded lower extremity engaging in a flanged nut 30 which bears against the underside of the cutter.

31 represents a longitudinally disposed screw-threaded spindle engaging in a nut 32 attached to the frame and extends through an apertured lug 33 of the carriage, and to which it is connected against relative longitudinal movements by the provision of a collar 34 on the spindle at one side of the lug and a wheel 35 which is secured to the spindle at the other side of the lug. Said wheel is advantageously provided with a crank-handle $35^1$ whereby the spindle is conveniently rotated by the operator to effect the feeding or retracting movements of the carriage.

36 (Fig. 3) represents a wearing strip interposed between one of the way surfaces $13^1$ and the opposing surface of the frame base, and is adjusted to compensate for wear by means of set screws such as 37. As illustrated, the frame is provided on each side with an apertured ear 38 whereby the machine is tiltably suspended, as by means of rods 39 from any suitable support.

In operation, the plate P which is to be machined or cut to provide therein recesses, such as R, (Fig. 5), may be placed on trestles or other suitable supports. The machine is then brought forward to have the edge of the plate enter the slots 17 between the various pairs of frame jaws 16, and against the throats 17¹ and, if required, shifted laterally to properly position the cutter with respect to the plate.

The machine frame is then clamped to the work by means of the set screws 18.

The office of the set screws 18¹ is to furnish adjustable rests or supports for the plate in the various slots 17 whereby the inclination of the plate relative to the direction of travel of the carriage and the milling cutter carried thereby, may be regulated to cause the bottom R¹ of a produced recess R to be at a selected inclination with respect to the upper and lower surfaces of the plate.

When the machine frame is thus secured to the work, and the motor actuated to drive the milling cutter, the latter is advanced by imparting a forward movement to the carriage through the agency of the feed screw 31 acting in the nut 32.

The milling cutter being fed forward effects the cutting of a recess in the plate, as will be understood.

Among the uses to which the present invention may be employed, is for cutting away material in overlapping portions of the plates of a ship hull to accommodate the frame ribs and thereby enable the latter to be juxtaposed with the plates.

What I claim, is—

1. In a machine of the class described, the combination with a carriage carrying a milling cutter and operating mechanism therefor, of a frame having guideways to engage said carriage for relative longitudinal travel, said frame being provided at opposite sides of said guideway with slots to receive the work, set screws extending into the respective slots for clamping the machine frame to the work.

2. In a machine of the class described, a frame having two spaced wing members, pairs of complementary jaws rigid with the respective wing members, set screws extending from below and from above into the slots obtaining between each pair of jaws, the lower of said set screws serving as bearing supports for a plate to be operated on and the upper set screws cooperating with the lower screws for clamping the plate to the frame at a selected angular relation, a substantially upright shaft, a milling cutter mounted thereon, and means to drive the shaft for actuating said cutter.

3. In a machine of the class described, a frame having two forwardly directed wing members to afford a gap therebetween, plate-clamping devices provided on the respective frame members, a carriage mounted on the frame for longitudinal movements, means for effecting the movements of the carriage, an upright shaft mounted in the carriage, a milling cutter secured to said shaft within the referred-to frame gap, and means carried by the carriage for driving said shaft to actuate the milling cutter.

4. A machine of the class described, including a pair of spaced wings having a gap therebetween, inclined jaws in each said wing having a means for securing a plate in adjustable inclined positions therein, a carriage movable longitudinally in a guideway provided in the frame, a nut secured in said frame, a screw spindle engaging in said nut and connected to the carriage, means for rotating said spindle to effect the longitudinal movements of the carriage, a vertical shaft carried by said frame, a milling cutter mounted on said shaft, and means to drive the shaft for actuating said cutter.

5. A machine of the class described, comprising a frame provided with a longitudinal gap, means provided in the frame for securing the same at opposite sides of the gap to a plate which is to be operated upon, an upright shaft, a milling cutter mounted on said shaft and operable within the frame gap, power-operated means for rotating said cutter, and manually-actuated means for effecting feed movements to the shaft and cutter with respect to the plate.

6. A machine of the class described, comprising a frame having clamping jaws on each side of its longitudinal axis, means for securing a plate in said jaws at selected inclinations relatively of the frame, a carriage slidably mounted on said frame, a milling cutter and means for driving the same carried on said carriage, and means operatively connecting the frame with the carriage whereby the latter is influenced to effect the feeding movements of said cutter.

Signed at Seattle, Washington, this 30th day of December, 1916.

DAVID RODGERS.

Witnesses:
 E. PETERSON,
 HORACE BARNES.